United States Patent
Kato et al.

(10) Patent No.: US 9,590,432 B2
(45) Date of Patent: Mar. 7, 2017

(54) BATTERY CONTROL DEVICE COMPRISING A PLURALITY OF CELL CONTROLLERS AND BEING CAPABLE OF DETERMINING WHETHER A CELL CONTROLLER IS OPERATING ABNORMALLY

(75) Inventors: Shinya Kato, Hitachinaka (JP); Akihiro Machida, Hitachinaka (JP); Tatsumi Yamauchi, Hitachinaka (JP)

(73) Assignee: Hitachi Automotive Systems, Inc., Ibaraki (JP)

( * ) Notice: Subject to any disclaimer, the term of this patent is extended or adjusted under 35 U.S.C. 154(b) by 134 days.

(21) Appl. No.: 14/402,892

(22) PCT Filed: May 24, 2012

(86) PCT No.: PCT/JP2012/063306
§ 371 (c)(1),
(2), (4) Date: Nov. 21, 2014

(87) PCT Pub. No.: WO2013/175605
PCT Pub. Date: Nov. 28, 2013

(65) Prior Publication Data
US 2015/0171642 A1    Jun. 18, 2015

(51) Int. Cl.
*H02J 7/00* (2006.01)
*H01M 10/42* (2006.01)
(Continued)

(52) U.S. Cl.
CPC ......... *H02J 7/0021* (2013.01); *H01M 10/425* (2013.01); *H01M 10/482* (2013.01);
(Continued)

(58) Field of Classification Search
CPC .... Y02E 60/12; G01R 31/3658; H02J 7/0021; H02J 7/0016; Y02T 10/7055
(Continued)

(56) References Cited

U.S. PATENT DOCUMENTS

| | | | | |
|---|---|---|---|---|
| 5,504,415 A * | 4/1996 | Podrazhansky | ....... | H02J 7/0016 320/118 |
| 2005/0242775 A1* | 11/2005 | Miyazaki | .............. | H02J 7/0026 320/116 |

(Continued)

FOREIGN PATENT DOCUMENTS

| | | | |
|---|---|---|---|
| JP | 11-355904 A | | 12/1999 |
| JP | 2002-008733 A | | 1/2002 |
| JP | 2010-193589 A | | 9/2010 |

*Primary Examiner* — Arun Williams
(74) *Attorney, Agent, or Firm* — Volpe and Koenig, P.C.

(57) ABSTRACT

A battery control device having a plurality of cell controllers which are provided corresponding to respective cell groups, are mutually connected in accordance with a predetermined communication order, and detect a state of each unit battery cell of a corresponding cell group, a control circuit which starts or stops a plurality of cell controllers, transmits a communication signal to the highest-order cell controller in a communication order among the plurality of cell controllers, and receives the communication signal from the lowest-order cell controller in the communication order among the plurality of cell controllers, and a first insulating element provided between the control circuit and the highest-order cell controller.

6 Claims, 7 Drawing Sheets

(51) Int. Cl.
*H01M 10/48* (2006.01)
*H04Q 9/00* (2006.01)

(52) U.S. Cl.
CPC ............ *H02J 7/007* (2013.01); *H02J 7/0022* (2013.01); *H04Q 9/00* (2013.01); *H01M 2010/4271* (2013.01); *H01M 2010/4278* (2013.01); *H04Q 2209/10* (2013.01); *H04Q 2209/30* (2013.01); *H04Q 2209/883* (2013.01); *Y02T 10/7055* (2013.01)

(58) Field of Classification Search
USPC ........................................................ 320/107
See application file for complete search history.

(56) References Cited

U.S. PATENT DOCUMENTS

2010/0209748 A1      8/2010  Kudo et al.
2011/0300415 A1*   12/2011  Kumagai .............. H02J 7/0021
                                                                        429/7

\* cited by examiner

BATTERY CONTROL DEVICE COMPRISING A PLURALITY OF CELL CONTROLLERS AND BEING CAPABLE OF DETERMINING WHETHER A CELL CONTROLLER IS OPERATING ABNORMALLY

TECHNICAL FIELD

The present invention relates to a battery control device.

BACKGROUND ART

Conventionally, there has been known a battery state detecting device in which a battery state detecting unit disposed for each of individual batteries constituting an assembled battery detects a battery state of each of the individual batteries, and the detected battery state is transmitted from the battery state detecting unit to an ECU for management (see, PTL 1). In the battery state detecting device, the battery state detecting unit is started in response to a battery state detection request received from the ECU for management and detects the battery state of the corresponding individual battery. After the detected battery state is transmitted to the ECU for management, the battery state detecting unit is held in a start standby state (sleep state).

CITATION LIST

Patent Literature

PTL 1: Japanese Patent Laid-Open Publication No. 11-355904

SUMMARY OF INVENTION

Technical Problem

In general, in electric vehicles such as an electric car and a hybrid car, as a power supply source to a motor for driving, a battery module in which a plurality of cell groups, having a plurality of battery cells connected in series, are connected in series is used. The battery module is connected to a battery control device. In the battery control device, a cell controller is provided corresponding to each of the cell groups of the battery module, and a state of each battery cell is detected using the cell controller. Each cell controller is started as necessary, and the operation of the cell controller is stopped when not needed to suppress battery power consumption.

In the above-described battery control device, in some cases, the operation is not appropriately stopped in any of the cell controllers, so that the operation is abnormally continued. Since the abnormal operation accelerates battery consumption and may in turn cause an overdischarge state leading to battery failure, the abnormal operation is required to be reliably diagnosed. However, in the battery state detecting device disclosed in PTL 1, the abnormal operation cannot be diagnosed.

Solution to Problem

A battery control device controls a battery module in which a plurality of cell groups including a plurality of connected unit battery cells are connected, the battery control device includes: a plurality of cell controllers which are provided corresponding to the respective cell groups, are mutually connected in accordance with a predetermined communication order, and detect a state of each unit battery cell of a corresponding cell group; a control circuit which starts or stops the plurality of cell controllers, transmits a communication signal to the highest-order cell controller in the communication order among the plurality of cell controllers, and receives the communication signal from the lowest-order cell controller in the communication order among the plurality of cell controllers; and a first insulating element provided between the control circuit and the highest-order cell controller. The control circuit stops the plurality of cell controllers and then outputs the communication signal to the first insulating element. When at least one of the plurality of cell controllers operates, the first insulating element passes the communication signal and outputs the communication signal to the highest-order cell controller, and when all the plurality of cell controllers stop, the first insulating element interrupts the communication signal. When the communication signal is transmitted from the control circuit or the cell controller higher by one order in the communication order to each of the plurality of cell controllers, each of the plurality of cell controllers starts when if it has been stopped, and maintains the operation state when it is operating, each of the plurality of cell controllers transfers the communication signal to the cell controller lower by one order in the communication order or the control circuit. The control circuit diagnoses abnormal operation of the plurality of cell controllers based on whether or not the control circuit receives the communication signal from the lowest-order cell controller.

Advantageous Effects of Invention

According to the teachings herein, abnormal operation of a cell controller can be reliably diagnosed.

DESCRIPTION OF EMBODIMENTS

Hereinafter, one embodiment of the present embodiment will be described with reference to drawings.

First Embodiment

Figure 1:
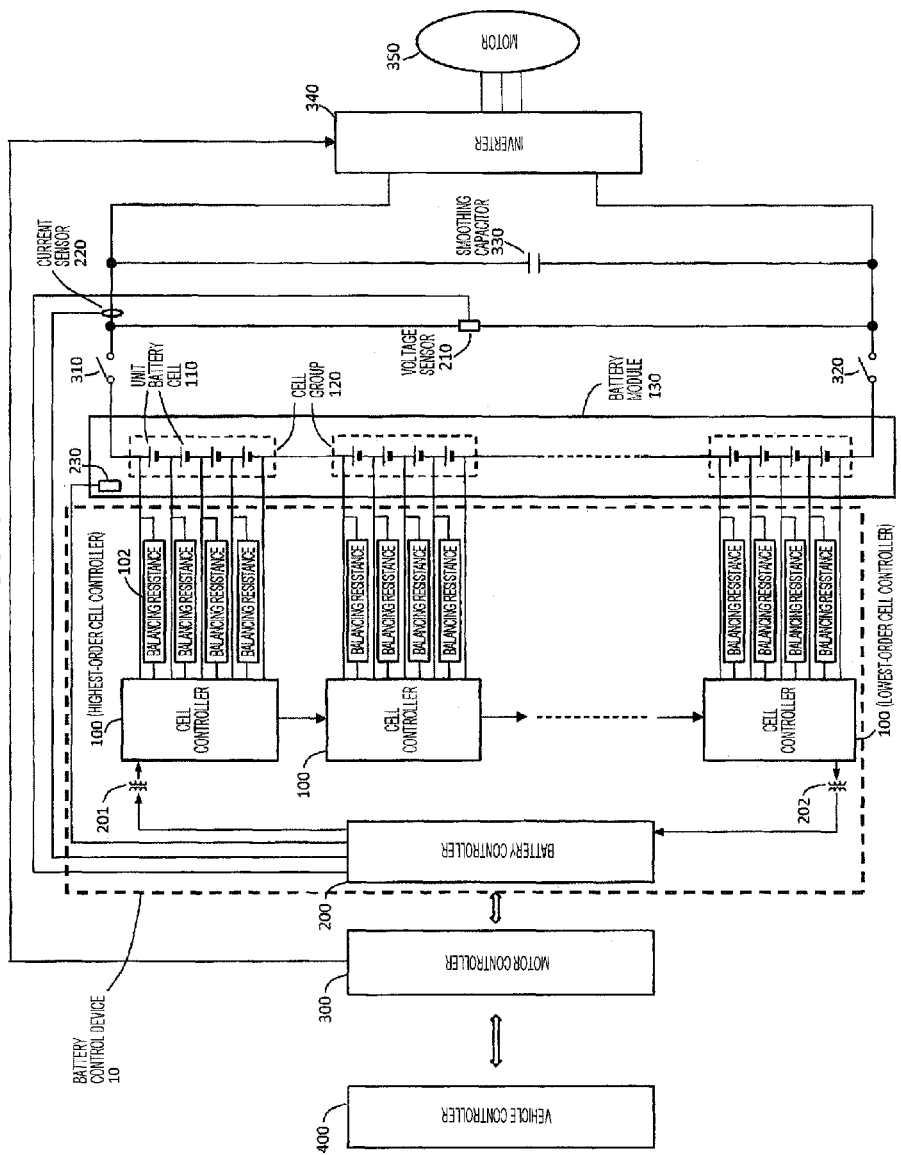
FIG. 1 is a view showing a configuration of a battery control device according to one embodiment.

FIG. 1 is a view showing a configuration of a battery control device 10 according to one embodiment. The battery control device 10 has a battery controller 200 and a plurality of cell controllers 100 mutually connected in accordance with a predetermined communication order. The battery control device 10 is mounted in an electric vehicle such as an electric car and a hybrid car along with a vehicle controller 400, a motor controller 300, a battery module 130, an inverter 340, a motor 350, and the like.

The battery module 130 is constituted of a plurality of series-connected cell groups 120. Each of the cell groups 120 is configured so that a plurality of unit battery cells 110 (hereinafter also referred to simply as cells) are connected in series. As each of the cells 110, a rechargeable battery such as a lithium ion battery is used, for example.

In the battery control device 10, a loop-shaped communication circuit is provided between the battery controller 200 and each of the cell controllers 100. The battery controller 200 transmits a communication signal to the highest-order cell controller 100 in a communication order through an insulating element 201. The highest-order cell controller 100 having received the communication signal transfers the communication signal to the cell controller 100 lower by one order in the communication order. Such an operation is sequentially performed in each of the cell controllers 100, whereby the communication signal is transmitted in series from the highest-order cell controller 100 to the lowest-order cell controller 100. The lowest-order cell controller 100 in the communication order transmits the communication signal to the battery controller 200 through an insulating element 202. In this way, the communication signal is exchanged between the battery controller 200 and each of the cell controllers 100 via the loop-shaped communication circuit.

The vehicle controller 400 controls a running speed and a braking/driving force of a vehicle based on an operation signal from a vehicle driving operation device (not shown) such as an accelerator pedal, a brake pedal, or a shift lever operated by a driver of an electric vehicle. The motor controller 300 controls the battery controller 200 and the inverter 340 based on a speed command and a braking/driving force command from the vehicle controller 400 and controls rotational speed and torque of a motor 350.

The battery controller 200 controls charging and discharging and SOC (State Of Charge) of the battery module 130 based on the voltage, current, and temperature of the battery module 130 detected respectively by a voltage sensor 210, a current sensor 220, and a temperature sensor 230. The battery controller 200 exchanges the communication signal with each of the cell controllers 100, as described above, thereby controls the operation of each of the cell controllers 100, and estimates the SOC of a plurality of the cells 110 constituting each of the cell groups 120 in the battery module 130. Based on the estimation result, discharge for correcting variation in the SOC between each of the cells 110 (hereinafter referred to as balancing discharge) is performed in order to prevent each of the cells 110 from being in an overcharged state. In this way, the battery control device 10 controls the battery module 130.

In FIG. 1, as the battery module 130, an assembled battery in which a plurality of the cell groups 120, having the four cells 110 connected in series, are connected in series is exemplified. However, the number of the cells 110 constituting the cell group 120 is not limited thereto, and less than four or four or more cells may be provided. In electric vehicles such as an electric car and a hybrid car, many cells or cell groups are connected in series-parallel, and a high pressure and high capacity battery module in which a both-end voltage thereof is approximately several 100 V is generally used. The present invention can be applied to such a high pressure and high capacity battery module.

The cell controller 100 is provided for each of the cell groups 120 for which the cells 110 constituting the battery module 130 are grouped for each predetermined number (four in FIG. 1). For example, the 100 cells 110 are connected in series in the battery module 130, and when the cells 110 are grouped four by four, 25 pairs of the cell groups 120 are provided, and the 25 cell controllers 100 are accordingly arranged in the battery control device 10.

Each of the cell controllers 100 detects each inter-terminal voltage of a positive electrode and a negative electrode for each of the cells 110 constituting the corresponding cell group 120, thereby measures a cell voltage, and transmits the measurement result to the battery controller 200. The battery controller 200 estimates the SOC of each of the cells 110 based on the measurement result of the cell voltage of each of the cells 110 transmitted from the cell controller 100 and outputs a balancing command to each of the cell controllers 100. Each of the cell controllers 100 performs energization control of a balancing current for each of the cells 110 in accordance with the balancing command from the battery controller 200. Between each of the cell controllers 100 and the cell group 120, a balancing resistance 102 for limiting the balancing current is provided for each of the cells 110.

When a vehicle is driven, DC power charged in the battery module 130 is supplied to a smoothing capacitor 330 and the inverter 340 through a positive electrode-side contactor 310 and a negative electrode-side contactor 320. The inverter 340 converts the DC power supplied from the battery module 130 into AC power and applies the AC power to the motor 350. The motor 350 is driven using the AC power. The inverter 340 is provided with a switching element (not shown), and the DC power is converted into the AC power by switching the switching element. Meanwhile, when a vehicle is braked, the AC power generated by the motor 350 is converted into the DC power by a diode element (not shown) of the inverter 340 and the smoothing capacitor 330. The DC power is applied to the battery module 130 through the positive electrode-side contactor 310 and the negative electrode-side contactor 320, and the battery module 130 is charged. In this way, the DC power is exchanged between the battery module 130 and the inverter 340.

Accompanying the operation of the inverter 340, ripple noise and switching noise are generated. Although those noises are reduced to some extent by the smoothing capacitor 330, the noises cannot be completely removed and flows into the battery module 130 to produce a noise current. In proportion to the noise current, a noise voltage is superimposed on an inter-terminal voltage of each of the cells 110 in the battery module 130. Since the noise becomes a detection error of a cell voltage, the noise is suppressed using an RC filter or the like when the cell voltage is measured.

Figure 2:
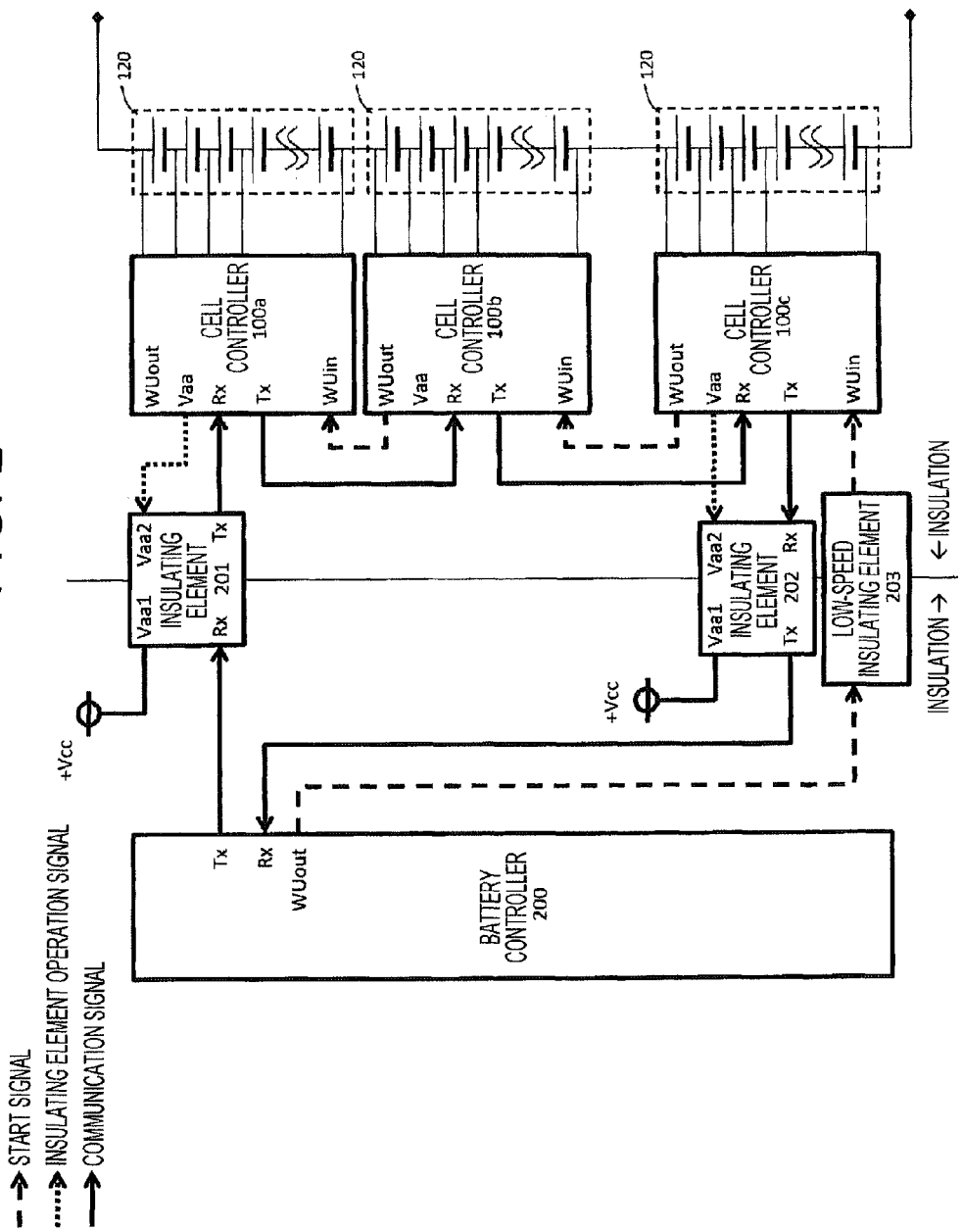
FIG. 2 is an explanatory view of a communication system of the battery control device of a first embodiment.

Next, communication between the battery controller 200 and each of the cell controllers 100 in the battery control device 10 will be described in detail. FIG. 2 is an explanatory view of a communication system of the battery control device 10 in a first embodiment of the present invention. In FIG. 2, although an example using the three cell controllers 100 (cell controllers 100a, 100b, and 100c) is shown, the same holds for the case of using the cell controllers 100 of the number other than three.

As shown in FIG. 2, cell controllers 100a, 100b, and 100c are connected to each other by a so-called daisy chain and each detect each cell state of the corresponding cell group 120 in response to an instruction from the battery controller 200. The cell controller 100a is located at the highest order in the communication order, and the cell controller 100c is located at the lowest order in the communication order. In FIG. 2, although the communication order of the cell controllers 100*a* to 100*c* matches the potential in the battery module 130 of the cell group corresponded to each cell controller, they may not be matched.

The battery controller 200 transmits a communication signal to the highest-order cell controller 100*a* from a communication signal output terminal Tx. The communication signal is input to a communication signal input terminal Rx of the insulating element 201 provided between the battery controller 200 and the cell controller 100*a*.

The insulating element 201 has a terminal Vaa1 to which a power supply voltage Vcc is input and a terminal Vaa2 to which an insulating element operation signal from the cell controller 100*a* is input. When the cell controller 100*a* is operating, the insulating element operation signal is output from the insulating element operation signal output terminal Vaa of the cell controller 100*a* to the insulating element 201. The insulating element 201 operates when the insulating element operation signal is input to the terminal Vaa2, passes the communication signal from the battery controller 200 input to the communication signal input terminal Rx, and outputs the communication signal from the communication signal output terminal Tx to the cell controller 100*a*. Meanwhile, the operation of the cell controller 100*a* is stopped, and when the insulating element operation signal is not output from the cell controller 100*a* to the insulating element 201, the insulating element 201 does not operate. At this time, when the communication signal transmitted from the battery controller 200 is input to the communication signal input terminal Rx, the insulating element 201 interrupts the communication signal and does not output the communication signal to the cell controller 100*a*.

The communication signal transmitted from the battery controller 200 through the insulating element 201 is input to the communication signal input terminal Rx of the cell controller 100*a*. When the cell controller 100*a* receives the communication signal, the cell controller 100*a* interprets the content of the communication signal, and when the communication signal includes a command to the cell controller 100*a*, the cell controller 100*a* executes processing corresponding to the command. The cell controller 100*a* outputs the communication signal from the communication signal output terminal Tx to the next cell controller 100*c* regardless of whether the processing is executed. At this time, the executed processing result may be included in the communication signal.

The communication signal transmitted from the cell controller 100*a* is input to the communication signal input terminal Rx of the cell controller 100*b*. When the cell controller 100*b* receives the communication signal, the cell controller 100*b* interprets the content of the communication signal as in the cell controller 100*a*, and when the communication signal includes a command to the cell controller 100*b*, the cell controller 100*b* executes processing corresponding to the command. The cell controller 100*b* outputs the communication signal from the communication signal output terminal Tx to the next cell controller 100*c* regardless of whether the processing is executed.

The communication signal transmitted from the cell controller 100*b* is input to the communication signal input terminal Rx of the lowest-order cell controller 100*c*. When the cell controller 100*c* receives the communication signal, the cell controller 100*c* interprets the content of the communication signal as in the cell controllers 100*a* and 100*b*, and when the communication signal includes a command to the cell controller 100*c*, the cell controller 100*c* executes processing corresponding to the command. The cell controller 100*c* outputs the communication signal from the communication signal output terminal Tx regardless of whether the processing is executed. The communication signal is input to the communication signal input terminal Rx of the insulating element 202 provided between the battery controller 200 and the cell controller 100*c*.

As in the insulating element 201, the insulating element 202 has the terminal Vaa1 to which the power supply voltage Vcc is input and the terminal Vaa2 to which the insulating element operation signal from the cell controller 100*c* is input. When the cell controller 100*c* is operating, the insulating element operation signal is output from the insulating element operation signal output terminal Vaa of the cell controller 100*c* to the insulating element 202. The insulating element 202 operates when the insulating element operation signal is input to the terminal Vaa2, passes the communication signal from the cell controller 100*c* input to the communication signal input terminal Rx, and outputs the communication signal from the communication signal output terminal Tx to the battery controller 200.

The communication signal transmitted from the cell controller 100*c* through the insulating element 202 is input to the communication signal input terminal Rx of the battery controller 200. When the battery controller 200 receives the communication signal, the battery controller 200 can confirm that communication has been normally performed between all the cell controllers 100*a*, 100*b*, and 100*c*.

When the cell controllers 100*a*, 100*b*, and 100*c* in a stop state receive the communication signal from the battery controller 200 or the cell controller higher by one order, each cell controller detects the communication signal to be started, and, thus, to start the operation. Each cell controller then transmits the communication signal to the cell controller lower by one order or the battery controller 200.

In addition to the insulating element 202, a low-speed insulating element 203 is provided between the battery controller 200 and the lowest-order cell controller 100*c*. The low-speed insulating element 203 is different from the insulating elements 201 and 202, and the power supply voltage Vcc and the insulating element operation signal are not required for the operation.

The battery controller 200 outputs a start signal from a start signal output terminal WUout to the lowest-order cell controller 100*c* through the low-speed insulating element 203. The start signal is input to a start signal input terminal WUin of the cell controller 100*c*.

The cell controller 100*c* operates when the start signal is input to the start signal input terminal WUin and outputs the start signal from the start signal output terminal WUout to the cell controller 100*b* higher by one order. The start signal is input to the start signal input terminal WUin in the cell controller 100*b*. As in the cell controller 100*c*, the cell controller 100*b* operates when the start signal is input to the start signal input terminal WUin, and the cell controller 100*b* outputs the start signal to the cell controller 100*a* higher from the start signal output terminal WUout by one order, that is, the highest-order cell controller 100*a*. The start signal is input to the signal input terminal WUin to operate the cell controller 100*a*.

As described above, the start signal is sequentially output from the lowest-order cell controller 100*c* to the highest-order cell controller 100*a* in response to the start signal output from the battery controller 200, and the cell controllers 100*a*, 100*b*, and 100*c* operate. Meanwhile, when the start signal from the battery controller 200 to the cell controller 100*c* is stopped, the operations of the cell controllers are stopped in order of the lowest-order cell controller 100*c* to the highest-order cell controller 100*a*, and the output of the start signal is stopped. After that, when the output of the start signal from the battery controller 200 to the cell controller 100c is restarted, the lowest-order cell controller 100c to the highest-order cell controller 100a are started in this order, and the operation is restarted. In this way, the battery controller 200 can start or stop the cell controllers 100a, 100b, and 100c.

Figure 3:
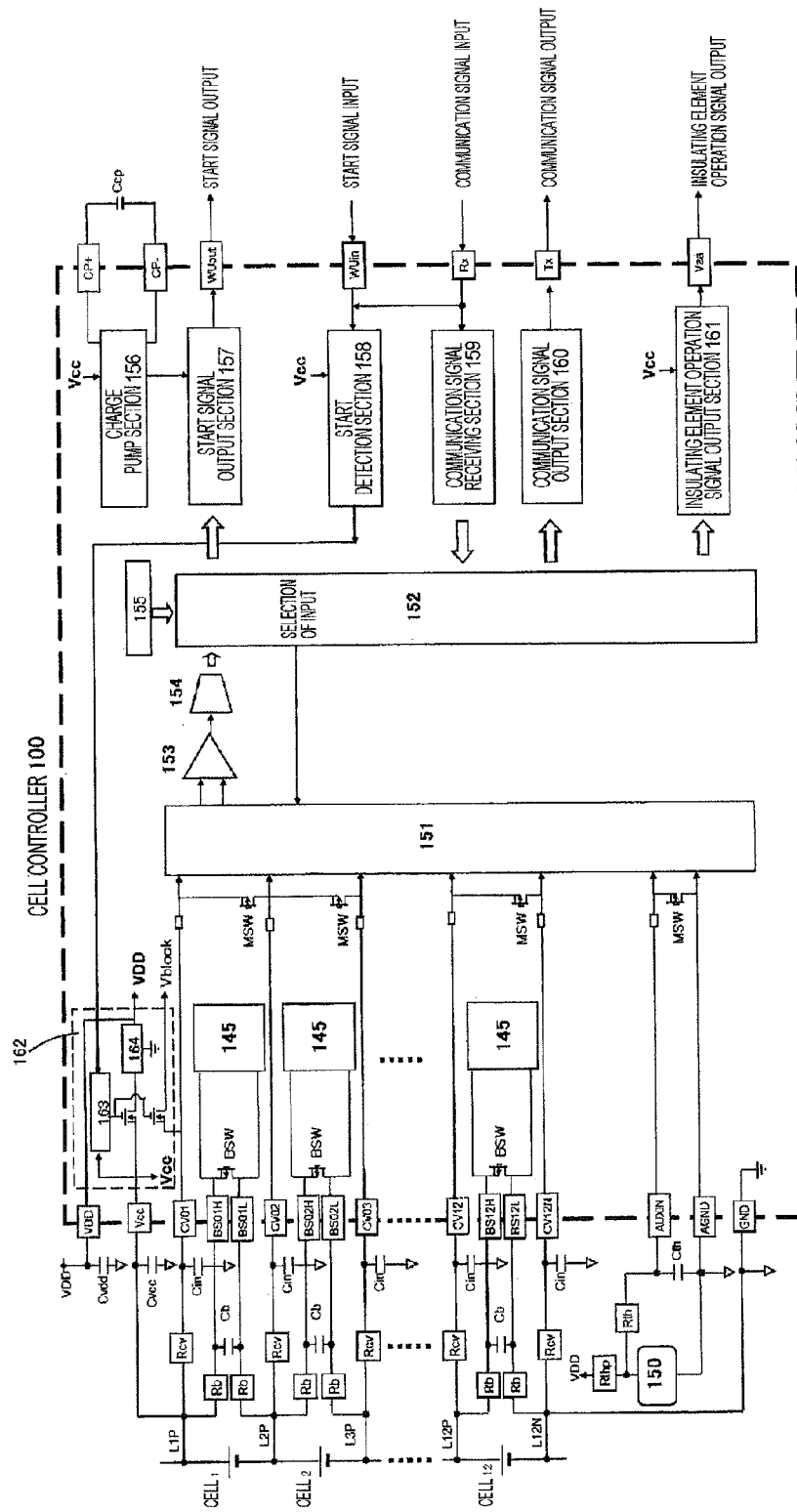
FIG. 3 is a view showing an internal configuration example of a cell controller.

Next, the internal configuration of the cell controller 100 will be described. FIG. 3 is a view showing an internal configuration example of the cell controller 100 according to the present invention. In FIG. 3, one cell group 120 is constituted of 12 unit battery cells 110 (referred to as cells 1 to 12).

The cell group 120 and the cell controller 100 controlling the cell group 120 are connected to CV terminals for voltage detection (terminals CV01 to CV12 and CV12N) and BS terminals for performing a balancing operation (terminals BS01H to BS12H and terminals BS01L to BS12L) through voltage detection lines L1P to L12P and L12N for detecting voltages of the cells 1 to 12. Both ends of each of the cells 1 to 12, that is, the positive electrode terminal and the negative electrode terminal are each connected to a CV terminal through a cell input resistance Rcv. A cell input capacitor Cin is connected to between each CV terminal and a GND terminal.

Each of both ends of the cells 1 to 12 is connected to a BS terminal through a balancing resistance Rb. In the cell controller 100, a balancing switch BSW for energizing the balancing current is connected to each of between the terminals BS01H to BS12H and the terminals BS01L to BS12L. When the balancing switch BSW corresponding to any cell is turned on, the balancing current of the relevant cell flows through the balancing resistance Rb. A balancing terminal capacitor Cb is connected to between the BS terminals.

Each CV terminal is connected to a multiplexor 151 in the cell controller 100. The multiplexor 151 selects an arbitrary cell, outputs a positive electrode potential and a negative electrode potential of the selected cell, and is controlled in response to an output from a logic section 152. The output of the multiplexor 151 is converted into the inter-terminal voltages of the cells 1 to 12 by a differential amplifier 153 and then converted into a digital value by an AD converter 154. The operation of the AD converter 154 is controlled by the logic section 152, and the output of the AD converter 154 is processed by the logic section 152. Namely, voltage measurement is performed by the differential amplifier 153 and the AD converter 154.

Among voltage input lines connected to the multiplexer 151, a multiplexer input short-circuiting switch MSW is provided between the two voltage input lines adjacent to each other, that is, between the voltage detection line connected to the positive electrode of each cell and the voltage detection line connected to the negative electrode of each cell.

The cell controller 100 is provided with auxiliary input terminals AUXIN and AGND. The auxiliary input terminals AUXIN and AGND are connected to a thermistor 150, a thermistor dividing resistance Rthp, a thermistor input resistance Rth, and a thermistor input capacitor Cth.

In the thermistor 150, the resistance value is significantly changed depending on the temperature of the installation place. VDD voltage is divided between the thermistor 150 and the thermistor dividing resistance Rthp connected in series with the thermistor 150. The inter-terminal voltage of the thermistor 150 is input from the auxiliary input terminals AUXIN and AGND to the cell controller 100. The thermistor input resistance Rth and the thermistor input capacitor Cth act as an RC filter for removing noise of the input signal. Namely, in the voltage generated by the thermistor 150 while corresponding to a change of temperature, noise is removed by the RC filter, and the voltage is input to the cell controller 100.

When the inter-terminal voltage of the thermistor 150 input to the cell controller 100 is selected by the multiplexor 151, the voltage value is digitalized through the differential amplifier 153 and the AD converter 154. The digitalized inter-terminal voltage value of the thermistor 150 is input to the logic section 152.

The logic section 152 transmits the digitalized inter-terminal voltage of the thermistor 150 as the communication signal from the communication signal output terminal Tx through a communication signal output section 160. The communication signal is transmitted to the battery controller 200 through the communication system as described in FIG. 2, whereby the digitalized inter-terminal voltage of the thermistor 150 is transmitted. The battery controller 200 calculates the temperature of the installation place of the thermistor 150 based on the inter-terminal voltage of the thermistor 150. The temperature can be calculated using a relational expression between the inter-terminal voltage and the temperature of the thermistor 150 previously set based on the resistance temperature characteristics of the thermistor 150 or data obtained by making the relation between the inter-terminal voltage and the temperature of the thermistor 150 into a table.

A balancing switch state detection circuit 145 detects presence/absence of the balancing current and diagnoses the balancing switch BSW. Those results are output to the logic section 152 and stored in a register in the logic section 152.

The logic section 152 is provided with the register storing data for controlling various switches provided in the cell controller 100. The register stores data for selecting input of the multiplexer 151, data for controlling the multiplexer input short-circuiting switch MSW, data controlling the balancing switch BSW, and data controlling a switch circuit of the balancing switch state detection circuit 145, for example. The logic section 152 receives a clock signal input from an oscillation circuit 155. The logic section 152 is operated using the clock signal.

The operation power supply Vcc of the cell controller 100 is supplied from a Vcc terminal connected to the voltage detection line L1P. The Vcc terminal is connected to a capacitor Cvcc for suppressing noise. The voltage detection line L1P is connected to the positive electrode side of the cell 1. A positive electrode-side voltage of the cell 1 is supplied as the operation power supply Vcc to the cell controller 100.

The Vcc terminal is further connected to a power supply unit 162 in the cell controller 100. The power supply unit 162 has a regulator 164. The regulator 164 generates the operation power supply VDD of 3.3 V with the use of the operation power supply Vcc supplied from the Vcc terminal and supplies the operation power supply VDD to the logic section 152 and the like. The operation power supply VDD is also supplied to a circuit outside the cell controller 100 through a VDD terminal of the cell controller 100. The VDD terminal is connected to a capacitor Cvdd for operation stabilization.

The power supply unit 162 has a starting circuit 163 operated according to a start detection signal from a start detection section 158. In the start detection section 158, when the communication signal transmitted from the battery controller 200 or the cell controller 100 higher by one order in the communication order described in FIG. 2 is input to the communication signal input terminal Rx, or when the start signal from the cell controller 100 lower by one order in the communication order or the battery controller 200 is input to the start signal input terminal WUin, the start detection section 158 detects the signals to output the start detection signal to the power supply unit 162. When the start detection signal from the start detection section 158 is input to the starting circuit 163, the starting circuit 163 outputs the operation power supply Vcc to the regulator 164 and, at the same time, starts the cell controller 100 to perform POR (power-on reset) operation.

When the cell controller 100 starts, a start signal output section 157 and an insulating element operation signal output section 161 are operated by the output from the logic section 152. The start signal output section 157 outputs the start signal from the start signal output terminal WUout to the cell controller 100 higher by one order in the communication order. In the insulating element operation signal output section 161, when the insulating element 201 or 202 of FIG. 2 is connected to the insulating element operation signal output section 161, the insulating element operation signal output section 161 outputs the insulating element operation signal from the insulating element operation signal output terminal Vaa to the insulating element.

The start detection section 158 is connected to the Vcc terminal. According to this constitution, even in such a state that the overall operation of the cell controller 100 is stopped, the operation power supply Vcc is supplied to the start detection section 158. The start detection section 158 has such a circuit configuration that the power consumption can be reduced as small as possible.

The communication signal output section 160 outputs a command signal as the communication signal and data from the communication signal output terminal Tx to the cell controller 100 lower by one order in the communication order or the battery controller 200, based on output data from the logic section 152. In a communication signal receiving section 159, when the command signal and data as the communication signal is input from the battery controller 200 or the cell controller 100 higher by one order in the communication order to the communication signal input terminal Rx, the communication signal receiving section 159 receives the command signal and data and outputs them to the logic section 152.

A charge pump section 156 generates a charge pump voltage with the use of the operation power supply Vcc in cooperation with a charge pump capacitor Ccp connected outside the cell controller 100 and supplies the charge pump voltage to start signal output section 157. The start signal output section 157 outputs the start signal having a voltage higher than the operation power supply Vcc with the use of the charge pump voltage in accordance with the potential of the cell group corresponding to the cell controller 100 as an output destination.

Subsequently, the diagnosis processing executed in the battery control device 10 will be described. The battery control device 10 stops all the cell controllers 100 through the battery controller 200 and executes the diagnosis processing for diagnosing whether or not the cell controller 100 normally stops the operation. Hereinafter, the content of the diagnosis processing will be described in accordance with the communication system exemplified in FIG. 2.

In the execution of the diagnosis processing, the battery controller 200 stops outputting the start signal to the lowest-order cell controller 100c. In response to this, the operation of the cell controller 100c is stopped, and the output of the start signal from the cell controller 100c to the cell controller 100b is stopped. According to this constitution, the operation of the cell controller 100b is stopped, and the output of the start signal from the cell controller 100b to the cell controller 100a is stopped. Consequently, the operation of the cell controller 100a is also stopped, and the operations of all the cell controllers are stopped.

After the operations of all the cell controllers are stopped as described above, the battery controller 200 outputs the communication signal to the insulating element 201. At this time, when all the cell controllers 100a, 100b, and 100c normally stop their operations, the insulating element operation signal is not output from the cell controller 100a to the insulating element 201, and the insulating element 201 does not operate. Accordingly, the communication signal is interrupted in the insulating element 201, and the communication signal is not returned from the cell controller 100c to the battery controller 200.

Figure 4:
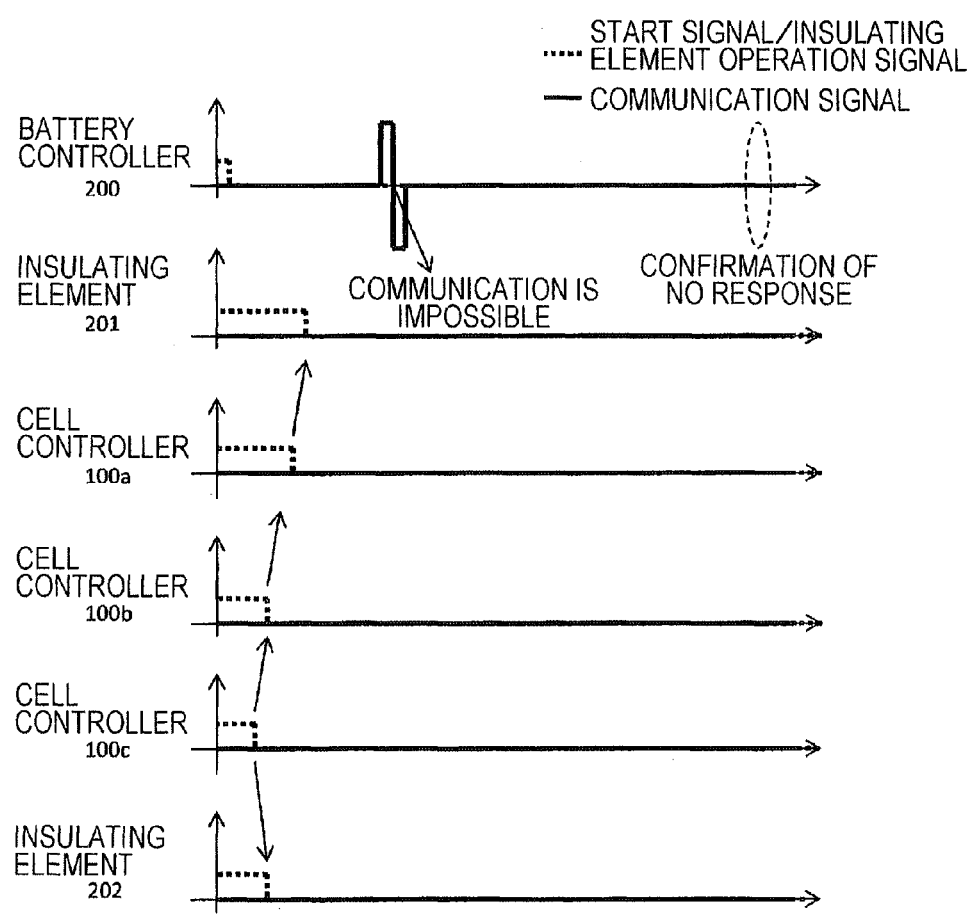
FIG. 4 is a view showing an example of a time chart when all the cell controllers have stopped operations.

FIG. 4 is a view showing an example of a time chart when the operations of all the controllers 100a, 100b, and 100c are normally stopped. In FIG. 4, when the start signal from the battery controller 200 is turned off, the cell controller 100c accordingly stops the operation, turns off the start signal to the cell controller 100b, and, at the same time, stops outputting the insulating element operation signal to the insulating element 202. When the start signal from the cell controller 100c is turned off, the cell controller 100b stops the operation and turns off the start signal to the cell controller 100a. When the start signal from the cell controller 100b is turned off, the cell controller 100a stops the operation and stops outputting the insulating element operation signal to the insulating element 201.

In the battery controller 200, after a lapse of a predetermined time from turning off of the start signal to the cell controller 100c, the battery controller 200 outputs the communication signal to the insulating element 201. The turning off of the start signal is transmitted from the lowest-order cell controller 100c to the highest-order cell controller 100a during a time from when the start signal is turned off until the communication signal is output, and sufficient time is set from when the cell controller 100a stops the operation until the cell controller 100a stops outputting the insulating element operation signal to the insulating element 201. In this case, communication is made impossible by interrupting the communication signal in the insulating element 201, and no response is returned from the cell controller 100c to the battery controller 200. This is confirmed in the battery controller 200, whereby it can be judged that all the cell controllers 100a, 100b, and 100c normally stop their operations.

Meanwhile, at least one of the cell controllers 100a, 100b, and 100c does not stop, and when the cell controller abnormally continues the operation due to any cause, the start signal is sequentially output from the relevant cell controller to each cell controller on the upper order side. Thus, the cell controller 100a is in the operation state, and the insulating element operation signal is output from the cell controller 100a to the insulating element 201. At this time, the insulating element 201 passes the communication signal from the battery controller 200 and outputs the communication signal to the cell controller 100a. The communication signal is transferred in order of the cell controllers 100a, 100b, and 100c and finally returned to the battery controller 200.

Figure 5:
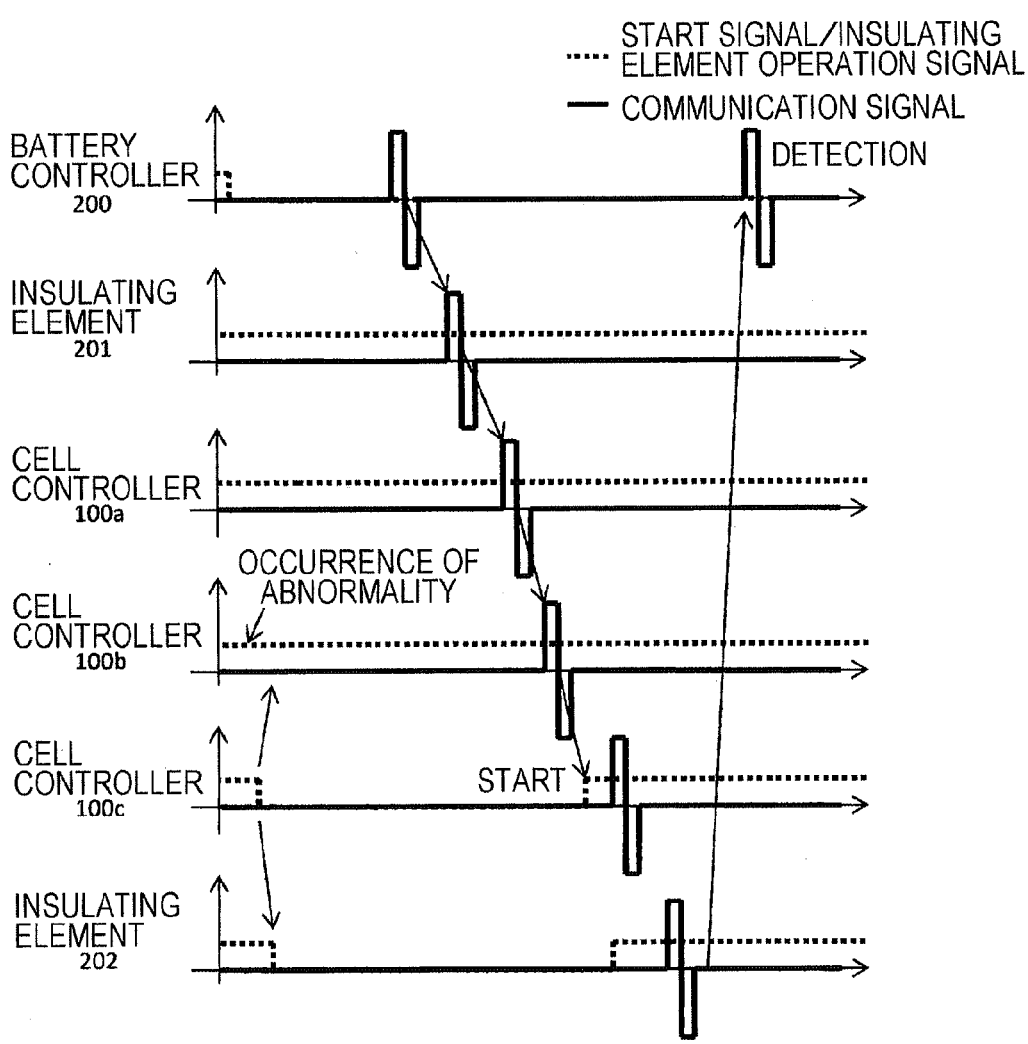
FIG. 5 is a view showing an example of a time chart when the cell controller abnormally continues the operation.

FIG. 5 is a view showing an example of a time chart when among the cell controllers 100a, 100b, and 100c, the cell controller 100b abnormally continues the operation. In FIG. 5, when the start signal from the battery controller 200 is turned off, the cell controller 100c stops the operation as in the case of FIG. 4, turns off the start signal to the cell controller 100*b*, and, at the same time, stops outputting the insulating element operation signal to the insulating element 202. However, even when the start signal from the cell controller 100*c* is turned off, the cell controller 100*b* continues the operation and maintains the turning on of the start signal to the cell controller 100*a*. Thus, the cell controller 100*a* continues the operation and continues to output the insulating element operation signal to the insulating element 201.

The battery controller 200 turns off the start signal to the cell controller 100*c* and then outputs the communication signal to the insulating element 201 as in the case of FIG. 4. The communication signal is output to the cell controller 100*a* through the insulating element 201 in the operation state by the output of the insulating element operation signal from the cell controller 100*a*. The cell controller 100*a* having received the communication signal transfers the communication signal to the cell controller 100*b* lower by one order. The cell controller 100*b* similarly transfers the communication signal to the cell controller 100*c* lower by one order. When the cell controller 100*c* receives the communication signal, the cell controller 100*c* which has been in the stop state is started. The cell controller 100*c* restarts the output of the insulating element operation signal to the insulating element 202 and transmits the communication signal to the battery controller 200 through the insulating element 202. The communication signal is detected in the battery controller 200, whereby it can be judged that at least one of the cell controllers 100*a*, 100*b*, and 100*c* (in this case, the cell controller 100*b*) abnormally continues the operation.

Although the example of the case in which among the cell controllers 100*a*, 100*b*, and 100*c*, the cell controller 100*b* abnormally continues the operation has been described above, the same holds for the case in which other cell controllers abnormally continue their operations. Further, the same holds for the case other than the communication system exemplified in FIG. 2, and for example, the case of using four or more cell controllers 100. Namely, when at least one of a plurality of the cell controllers 100 abnormally continues the operation, the highest-order controller 100 in the communication order is in the operation state, and therefore, the insulating element operation signal is output to the insulating element 201. In this state, when the communication signal is output from the battery controller 200 to the insulating element 201, the communication signal is transferred from the highest-order cell controller 100 to the lowest-order cell controller 100. At this time, the cell controller 100 in the stop state is started by receiving the communication signal. Then, the communication signal is returned from the lowest-order cell controller 100 to the battery controller 200, and it is judged that it is abnormal in the battery controller 200.

Figure 6:
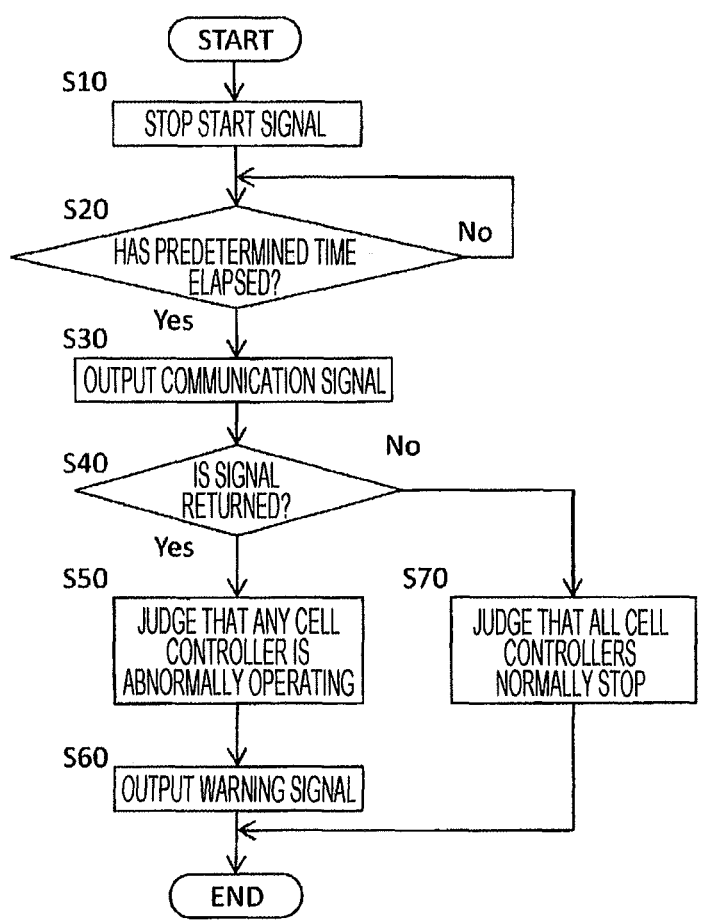
FIG. 6 is a flow chart when diagnosis processing is executed in a battery controller.

FIG. 6 is a flow chart when the above-described diagnosis processing is executed in the battery controller 200. In step S10, the battery controller 200 stops outputting the start signal to the lowest-order cell controller 100*c*.

In step S20, the battery controller 200 determines whether or not a predetermined time has elapsed from the start signal is stopped in step S10. When the predetermined time has elapsed, the communication signal is output to the insulating element 201 in step S30.

In step S40, the battery controller 200 determines whether or not the communication signal is returned from the cell controller 100*c* according to the communication signal output in step S30. When the communication signal is returned, the flow proceeds to step S50, and when the communication signal is not returned, the flow proceeds to step S70.

In step S50, the battery controller 200 judges that any one of the cell controllers 100*a*, 100*b*, and 100*c* is abnormally operating. After that, in step S60, the battery controller 200 outputs a predetermined warning signal to the vehicle controller 400 of FIG. 1. When the vehicle controller 400 receives the warning signal, the vehicle controller 400 executes predetermined processing. For example, the vehicle controller 400 notifies a driver of a vehicle of occurrence of abnormality. After the execution of step S60, the battery controller 200 terminates the diagnosis processing.

Meanwhile, in step S70, the battery controller 200 judges that all the cell controllers 100*a*, 100*b*, and 100*c* normally stop. After the execution of step S70, the battery controller 200 terminates the diagnosis processing.

According to the above-described embodiment, the following operational advantages are provided.

(1) The battery control device 10 controls the battery module 130 in which a plurality of the cell groups 120 having a plurality of the unit battery cells 110 connected in series are connected in series and is provided with a plurality of the cell controllers 100, the battery controller 200, and the insulating element 201. The cell controllers 100 are provided corresponding to the respective cell groups 120, are mutually connected in accordance with a predetermined communication order, and each detect each state of the unit battery cells 110 of the corresponding cell group 120. The battery controller 200 starts and stops a plurality of the cell controllers 100, transmits the communication signal to the highest-order cell controller 100*a* in the communication order among a plurality of the cell controllers 100, and receives the communication signal from the lowest-order cell controller 100*c* in the communication order among a plurality of the cell controllers 100. The insulating element 201 is provided between the battery controller 200 and the highest-order cell controller 100*a*. In the diagnosis processing, the battery controller 200 stops a plurality of the cell controllers 100 (S10 in FIG. 6) and then outputs the communication signal to the insulating element 201 (step S30). When at least one of a plurality of the cell controllers 100 is operating, the insulating element 201 passes the communication signal and outputs the communication signal to the highest-order cell controller 100*a*, and meanwhile, when all the cell controllers 100 stop, the insulating element 201 interrupts the communication signal. In each of a plurality of the cell controllers 100, when the communication signal is transmitted from the battery controller 200 or the cell controller 100 higher by one order in the communication order, if the cell controller 100 is in the stop state, the cell controller 100 starts, and if the cell controller 100 is operating, the cell controller 100 transfers the communication signal to the cell controller 100 lower by one order in the communication order or the battery controller 200 while maintaining the operation state. The battery controller 200 judges the abnormal operation of a plurality of the cell controllers 100 (steps S50 and S70) based on whether or not the communication signal is received from the lowest-order cell controller 100*c* (step S40). According to this constitution, the abnormal operation of the cell controller 100 can be reliably diagnosed.

(2) When at least one of a plurality of the cell controllers 100 operates, the highest-order cell controller 100*a* outputs the insulating element operation signal for operating the insulating element 201. The insulating element 201 is operated by receiving the insulating element operation signal from the highest-order cell controller 100a, thereby passes the communication signal from the battery controller 200, and outputs the communication signal to the highest-order cell controller 100a. According to this constitution, the communication signal can be reliably passed or interrupted in the insulating element 201 based on whether or not at least one of a plurality of the cell controllers 100 operates.

(3) Each of a plurality of the cell controllers 100 except for the highest-order cell controller 100a outputs the start signal for operating the cell controller 100 higher by one order in the communication order during operation. The highest-order cell controller 100a is operated by receiving the start signal from the cell controller 100b lower by one order in the communication order and outputs the insulating element operation signal. According to this constitution, when at least one of a plurality of the cell controllers 100 operates, the insulating element operation signal can be output from the highest-order cell controller 100a to the insulating element 201.

(4) The battery controller 200 stops the output of the start signal to the lowest-order cell controller 100c and thereby stops a plurality of the cell controllers 100. According to this constitution, a plurality of the cell controllers 100 can be easily and reliably stopped through the battery controller 200.

(5) The battery control device 10 is further provided with the insulating element 202 provided between the battery controller 200 and the lowest-order cell controller 100c. The lowest-order cell controller 100c outputs the insulating element operation signal for operating the insulating element 202 during operation. The insulating element 202 is operated by receiving the insulating element operation signal from lowest-order cell controller 100c, thereby passes the communication signal from the lowest-order cell controller 100c, and outputs the communication signal to the battery controller 200. According to this constitution, the communication signal can be transmitted from the cell controller 100c to the battery controller 200 in such a state that the battery controller 200 and the cell controller 100c are insulated therebetween. Further, the insulating element 202 is stopped during stoppage of the operation of the cell controller 100c, so that unnecessary power consumption can be suppressed.

Second Embodiment

Figure 7:
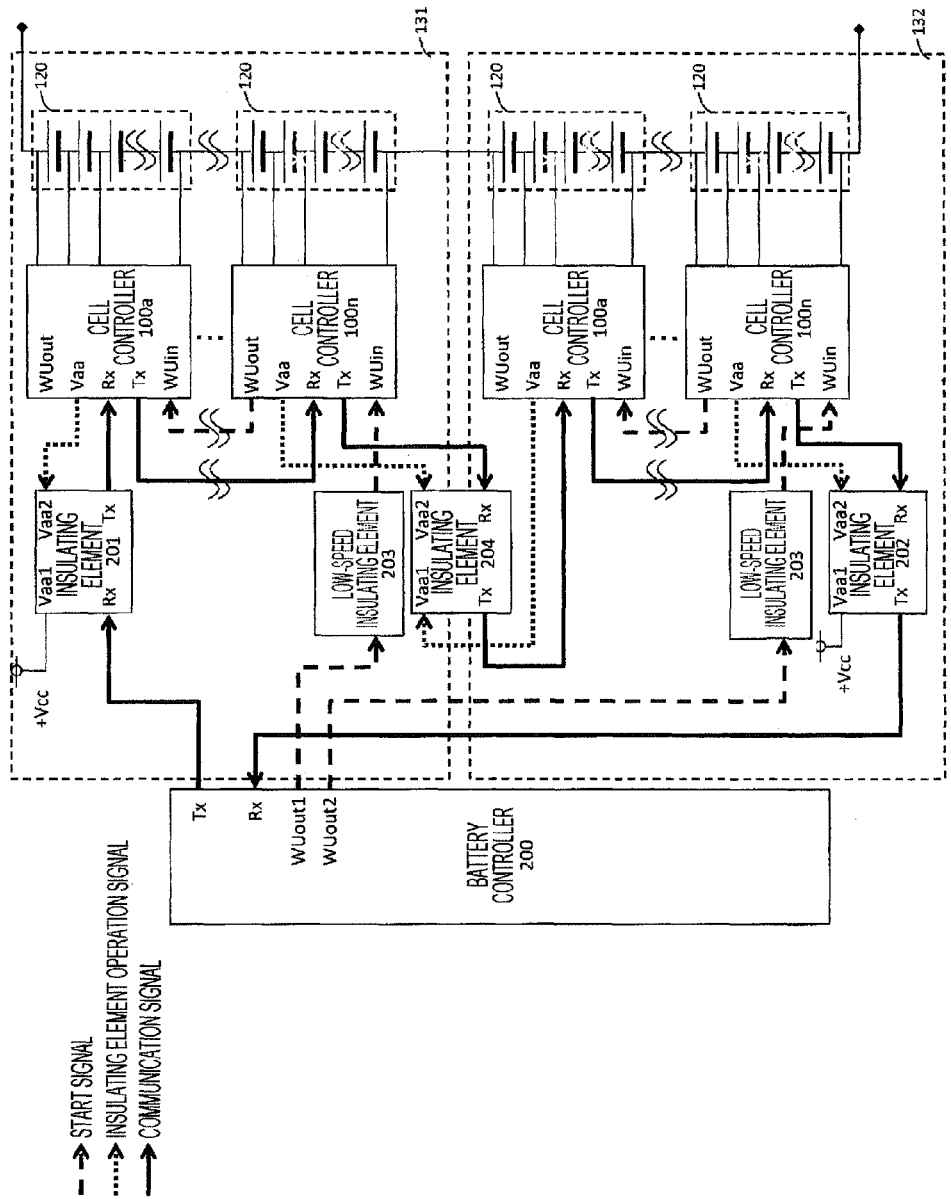
FIG. 7 is an explanatory view of a communication system of a battery control device in a second embodiment.

Next, a second embodiment will be described. FIG. 7 is an explanatory view of a communication system of a battery control device 10 in the second embodiment. The communication system shown in FIG. 7 is different from the communication system of the first embodiment shown in FIG. 2 in that the communication system is divided into two blocks 131 and 132, and an insulating element 204 provided for the blocks 131 and 132 in common is installed. FIG. 7 shows an example in which the blocks 131 and 132 each have n cell controllers 100 (cell controllers 100a to 100n). Among the cell controllers 100, illustration of the cell controllers 100 other than the highest-order cell controller 100a and the lowest-order cell controller 100n is omitted.

In FIG. 7, the insulating element 204 has a structure similar to that of the insulating elements 201 and 202. In the insulating element 204, an insulating element operation signal from the cell controller 100n of the block 131 and an insulating element operation signal from the cell controller 100a of the block 132 are input respectively to an terminal Vaa1 and a terminal Vaa2. When both the insulating element operation signals are input, the insulating element 204 operates, then passes a communication signal input from the cell controller 100n of the block 131 to a communication signal input terminal Rx, and outputs the communication signal from a communication signal output terminal Tx to the cell controller 100a of the block 132.

In the communication system shown in FIG. 7, a battery controller 200 outputs the start signal to the cell controller 100n of the block 131 from a start signal output terminal WUout1 through a low-speed insulating element 203 in the block 131. Meanwhile, the battery controller 200 outputs a start signal from a start signal output terminal WUout2 to the cell controller 100n of the block 132 through the low-speed insulating element 203 in the block 132. Consequently, the cell controllers 100a to 100n of the block 131 and the cell controllers 100a to 100n of the block 132 can be individually started or sopped.

When diagnosis processing is executed in the battery control device 10 of the present embodiment, while either the cell controllers 100a to 100n of the block 131 or the cell controllers 100a to 100n of the block 132 are held in the operation state, the other cell controllers are stopped, and in this state, the communication signal is output from the battery controller 200 to the insulating element 201. At this time, if all the cell controllers 100a to 100n normally stop their operations in the stopped block, the insulating element 201 or the insulating element 204 does not operate, and therefore the communication signal is interrupted. Consequently, as in the first embodiment, the communication signal is not returned from the cell controller 100n of the block 132 to the battery controller 200.

Meanwhile, it is assumed that at least one of the cell controllers 100a to 100n does not stop in the stopped block and abnormally continues the operation due to any cause. In this case, as in the first embodiment, the start signal is sequentially output from the relevant cell controller to each cell controller on the upper order side, and therefore, the cell controller 100a is in the operation state in the block, and the insulating element operation signal is output from the cell controller 100a to the insulating element 201 (when the block 131 is stopped) or the insulating element 204 (when the block 132 is stopped). When the block 131 is stopped, the insulating element operation signals are output from the cell controllers 100a and 100n of the operating block 132 to the insulating elements 204 and 202, respectively, and when the block 132 is stopped, the insulating element operation signals are output from the cell controllers 100a and 100n of the operating block 131 to the insulating elements 201 and 204, respectively. According to this constitution, the communication signal output from the battery controller 200 passes through the insulating elements 201 and 204 and is then returned to the battery controller 200 from the cell controller 100n of the block 132 through the insulating element 202.

As described above, when all the cell controllers 100a to 100n normally stop their operations in the stopped block, the communication signal is not returned from the cell controller 100n of the block 132 to the battery controller 200. However, when at least one of the cell controllers 100a to 100n abnormally continues the operation in the stopped block, the communication signal is returned from the cell controller 100n of the block 132 to the battery controller 200. Accordingly, the abnormality can be detected as in the first embodiment. Although the case in which the number of divisional blocks is two has been described in the above example, the same holds for the case in which the communication system is divided into a larger number of blocks.

According to the above-described second embodiment, the operational advantages similar to those described in the first embodiment can be provided. In addition, the battery control device 10 is provided with the common insulating element 204 provided between the two blocks 131 and 132 adjacent to each other in the communication order. The lowest-order cell controller 100n in the block 131 on the upper order side in the communication order and the highest-order cell controller 100a in the block 132 on the lower order side in the communication order each output the insulating element operation signal for operating the insulating element 204 during operation. The insulating element 204 is operated by receiving the insulating element operation signal from the lowest-order cell controller 100n in the block 131 on the upper order side and the insulating element operation signal from the highest-order cell controller 100a in the block 132 on the lower order side, thereby passes the communication signal from the lowest-order cell controller 100n in the block 131 on the upper order side, and outputs the communication signal to the highest-order cell controller 100a in the block 132 on the lower order side. According to this constitution, while the blocks 131 and 132 adjacent to each other are insulated therebetween, the communication signal can be transmitted from the block 131 on the upper order side to the block 132 on the lower order side. Consequently, the abnormal operations of a plurality of the cell controllers 100 can be diagnosed in the unit of block.

In each of the above-described embodiments, although the examples of the battery control device mounted in an electric vehicle such as an electric car and a hybrid car have been described, the present invention is not limited to the examples but is applicable to a battery control device mounted in various equipment and devices.

The present teachings are not limited to each of the above-described embodiments but are applicable while being suitably changed without departing from the gist of the invention.

The invention claimed is:

1. A battery control device that controls a battery module in which a plurality of cell groups including a plurality of connected unit battery cells are connected, comprising:
a plurality of cell controllers which are provided corresponding to the respective cell groups, are mutually connected in accordance with a predetermined communication order, and detect a state of each unit battery cell of a corresponding cell group;
a control circuit which starts or stops the plurality of cell controllers, transmits a communication signal to a highest-order cell controller in the communication order among the plurality of cell controllers, and receives the communication signal from a lowest-order cell controller in the communication order among the plurality of cell controllers; and
a first insulating element provided between the control circuit and the highest-order cell controller,
wherein the control circuit stops the plurality of cell controllers and then outputs the communication signal to the first insulating element,
when at least one of the plurality of cell controllers operates, the first insulating element passes the communication signal and outputs the communication signal to the highest-order cell controller, and when all the plurality of cell controllers stop, the first insulating element interrupts the communication signal,
when the communication signal is transmitted from the control circuit or the cell controller higher by one order in the communication order to each of the plurality of cell controllers, each of the plurality of cell controllers starts when it is during stopping and maintains the operation state when it is during operation, each of the plurality of cell controllers transfers the communication signal to the cell controller lower by one order in the communication order or the control circuit, and
the control circuit diagnoses abnormal operation of the plurality of cell controllers based on whether or not the control circuit receives the communication signal from the lowest-order cell controller, wherein when the control circuit receives the communication signal from the lowest-order cell controller, the control circuit diagnoses abnormal operation.

2. The battery control device according to claim 1, wherein when at least one of the plurality of cell controllers operates, the highest-order cell controller outputs an insulating element operation signal for operating the first insulating element, and
the first insulating element is operated by receiving the insulating element operation signal from the highest-order cell controller, passes the communication signal from the control circuit, and outputs the communication signal to the highest-order cell controller.

3. The battery control device according to claim 2, wherein each of the plurality of cell controllers except for the highest-order cell controller outputs a start signal for operating a cell controller higher by one order in the communication order during operation, and
the highest-order cell controller is operated by receiving the start signal from a cell controller lower by one order in the communication order and outputs the insulating element operation signal.

4. The battery control device according to claim 3, wherein the control circuit stops outputting the start signal to the lowest-order cell controller and stops the plurality of cell controllers.

5. The battery control device according to claim 1, further comprising a second insulating element provided between the control circuit and the lowest-order cell controller,
wherein the lowest-order cell controller outputs an insulating element operation signal for operating the second insulating element during operation, and
the second insulating element is operated by receiving the insulating element operation signal from the lowest-order cell controller, thereby passes the communication signal from the lowest-order cell controller, and outputs the communication signal to the control circuit.

6. The battery control device according to claim 1, wherein the plurality of cell controllers are divided into a plurality of blocks,
the battery control device further comprising a common insulating element provided between two blocks adjacent to each other in the communication order, wherein
the lowest-order cell controller in a block on the upper order side in the communication order in the adjacent two blocks and the highest-order cell controller in a block on the lower order side in the communication order in the adjacent two blocks each output an insulating element operation signal for operating the common insulating element during operation, and
the common insulating element is operated by receiving the insulating element signal from the lowest-order cell controller in the block on the upper order side and the insulating element signal from the highest-order cell controller in the block on the lower order side, passes the communication signal from the lowest-order cell controller in the block on the upper order side, and outputs the communication signal to the highest-order cell controller in the block on the lower order side.

\* \* \* \* \*